(12) United States Patent
Park et al.

(10) Patent No.: US 7,570,756 B2
(45) Date of Patent: Aug. 4, 2009

(54) METHOD FOR SUPPORTING SESSION MOBILITY

(75) Inventors: Hyun-Seo Park, Daejeon (KR); Je-Hun Rhee, Daejeon (KR); Kyung-Sook Kim, Daejeon (KR); Sook-Yang Kang, Daejeon (KR); Young-Jick Bahg, Daejeon (KR); Gyung-Chul Shin, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 575 days.

(21) Appl. No.: 11/271,034

(22) Filed: Nov. 9, 2005

(65) Prior Publication Data

US 2006/0126648 A1    Jun. 15, 2006

(30) Foreign Application Priority Data

Dec. 14, 2004    (KR)    ........................ 10-2004-0105570

(51) Int. Cl.
*H04L 12/16* (2006.01)
(52) U.S. Cl. ........................ 379/270; 370/331; 455/436; 709/227
(58) Field of Classification Search ................ 370/270, 370/313, 331, 390, 401, 428, 475
See application file for complete search history.

(56) References Cited

U.S. PATENT DOCUMENTS

| | | | |
|---|---|---|---|
| 2003/0088765 A1* | 5/2003 | Eschbach et al. | 713/150 |
| 2003/0187871 A1* | 10/2003 | Amano et al. | 707/102 |
| 2003/0195963 A1 | 10/2003 | Song et al. | |
| 2004/0139198 A1* | 7/2004 | Costa-Requena et al. | 709/227 |
| 2006/0026288 A1* | 2/2006 | Acharya et al. | 709/227 |

OTHER PUBLICATIONS

Henning Schulzrinne, et al "Application-Layer Mobility Using SIP" ACM SIGMOBILE Mobile Computing and Communications Review, vol. 4, Issues 3, pp. 47-57, Jul. 2000.

* cited by examiner

*Primary Examiner*—Chirag G Shah
*Assistant Examiner*—Yong Zhou
(74) *Attorney, Agent, or Firm*—Blakely, Sokoloff, Taylor & Zafman LLP

(57) ABSTRACT

A method for supporting session mobility, more particularly, a method for supporting session mobility that can move various sessions between two or more devices by using session initiation protocol (SIP). Various sessions can be simultaneously moved by utilizing a SIP PUBLISH message. Accordingly, a user can utilize various services as they are regardless of changing of service receiving device while the user utilizes various services. Also, the session mobility can be effectively supported whether the target of the session movement is known or not.

10 Claims, 5 Drawing Sheets

[FIG. 1]
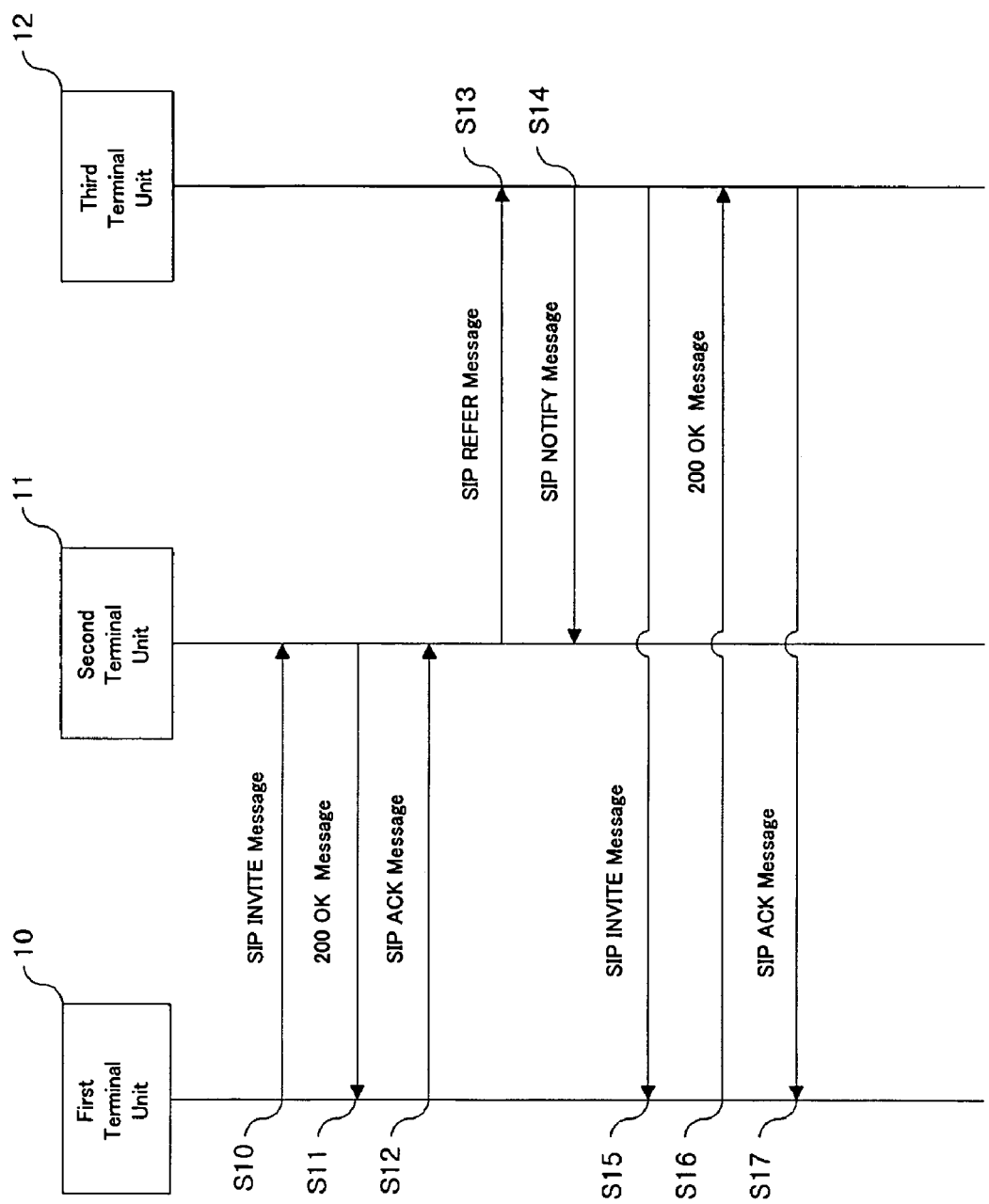

[FIG. 2]
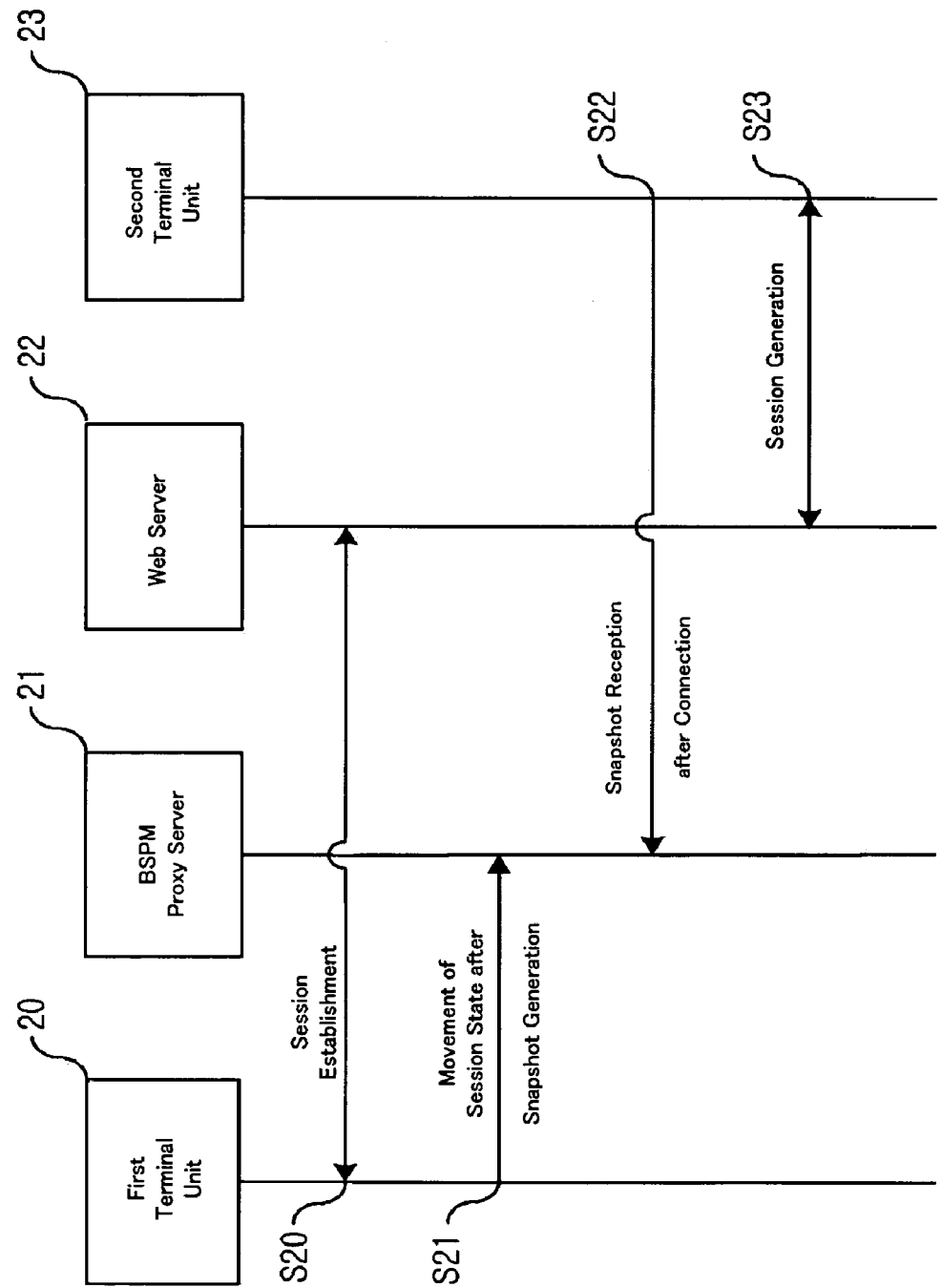

[FIG. 3]
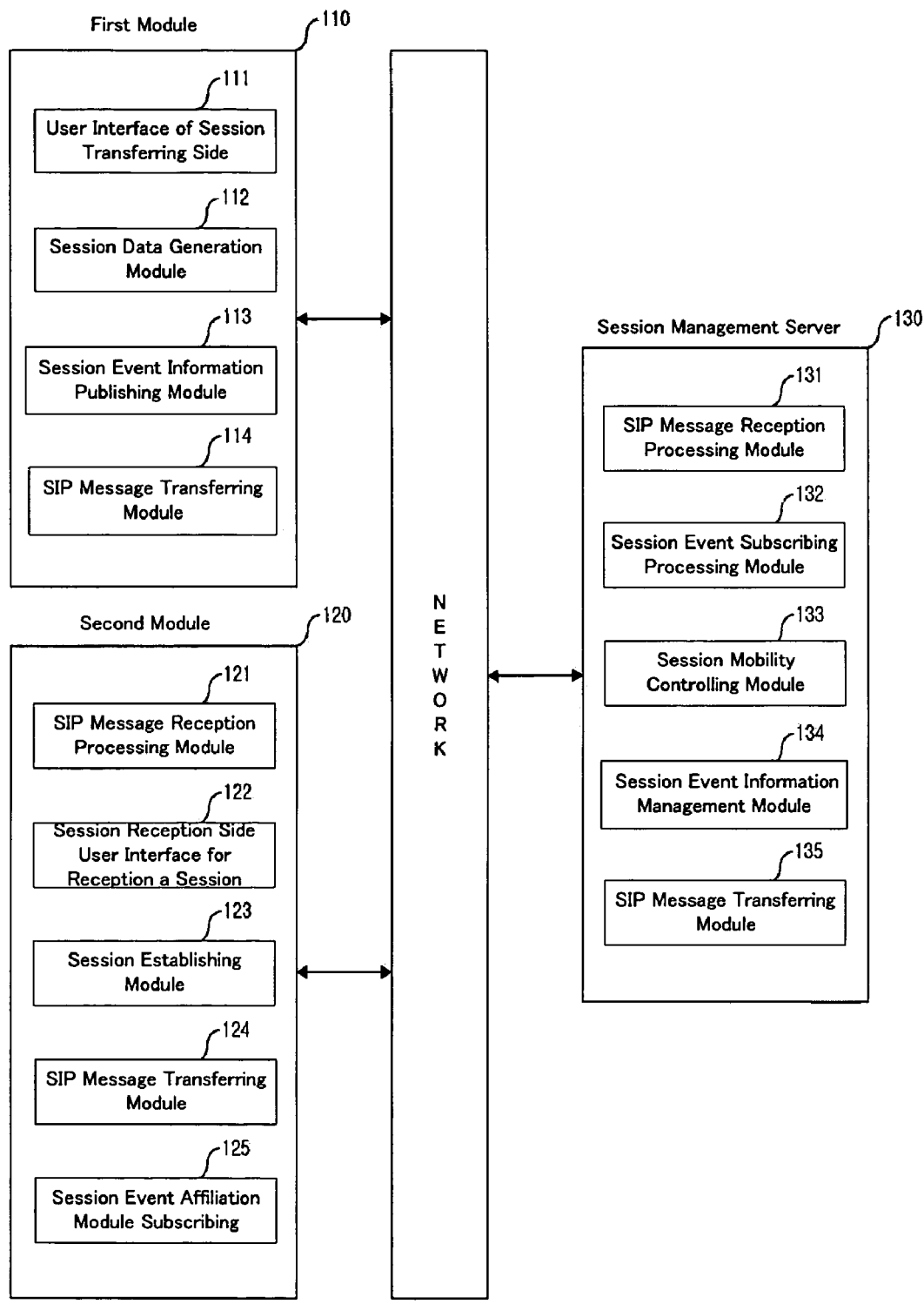

[FIG. 4]
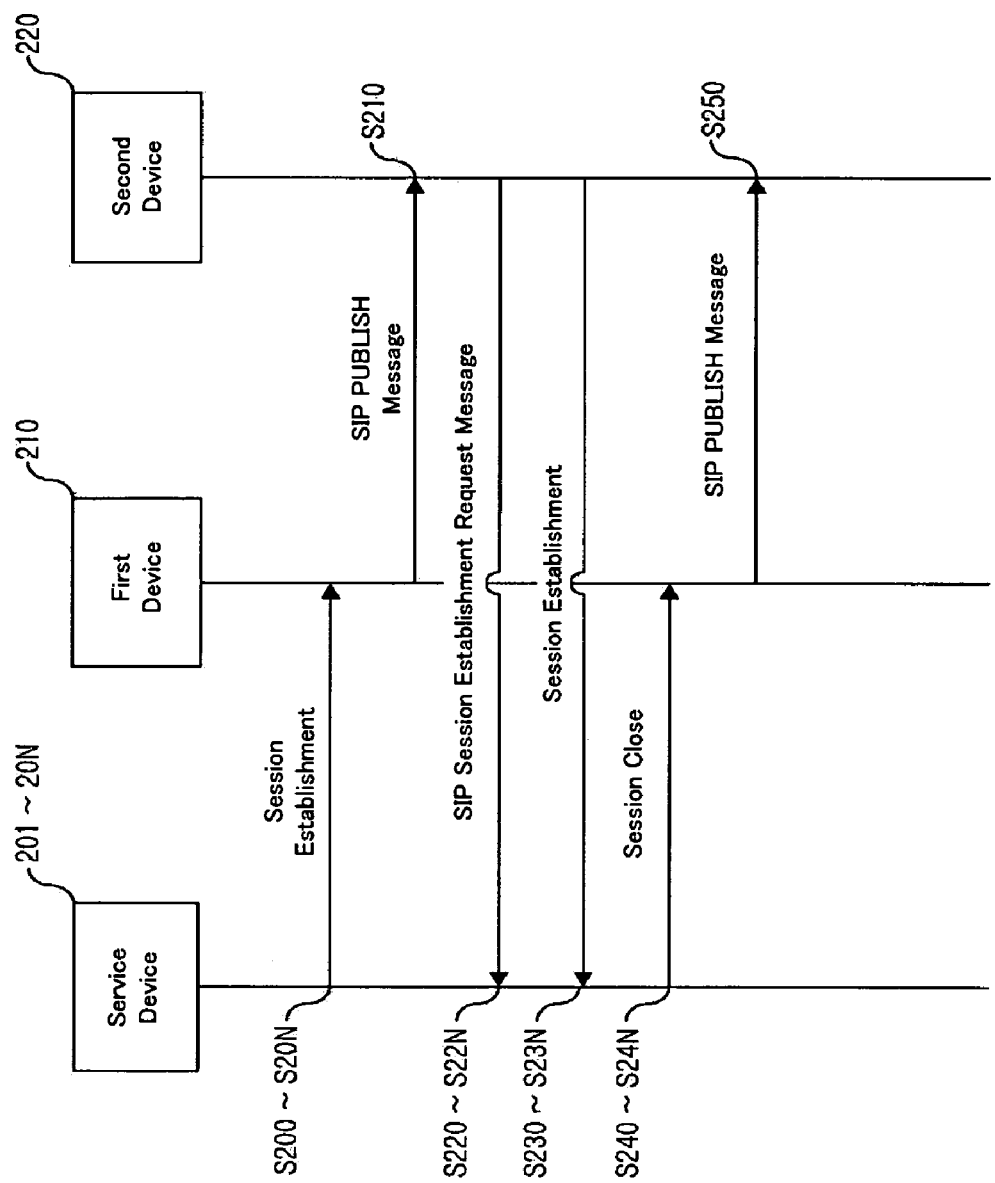

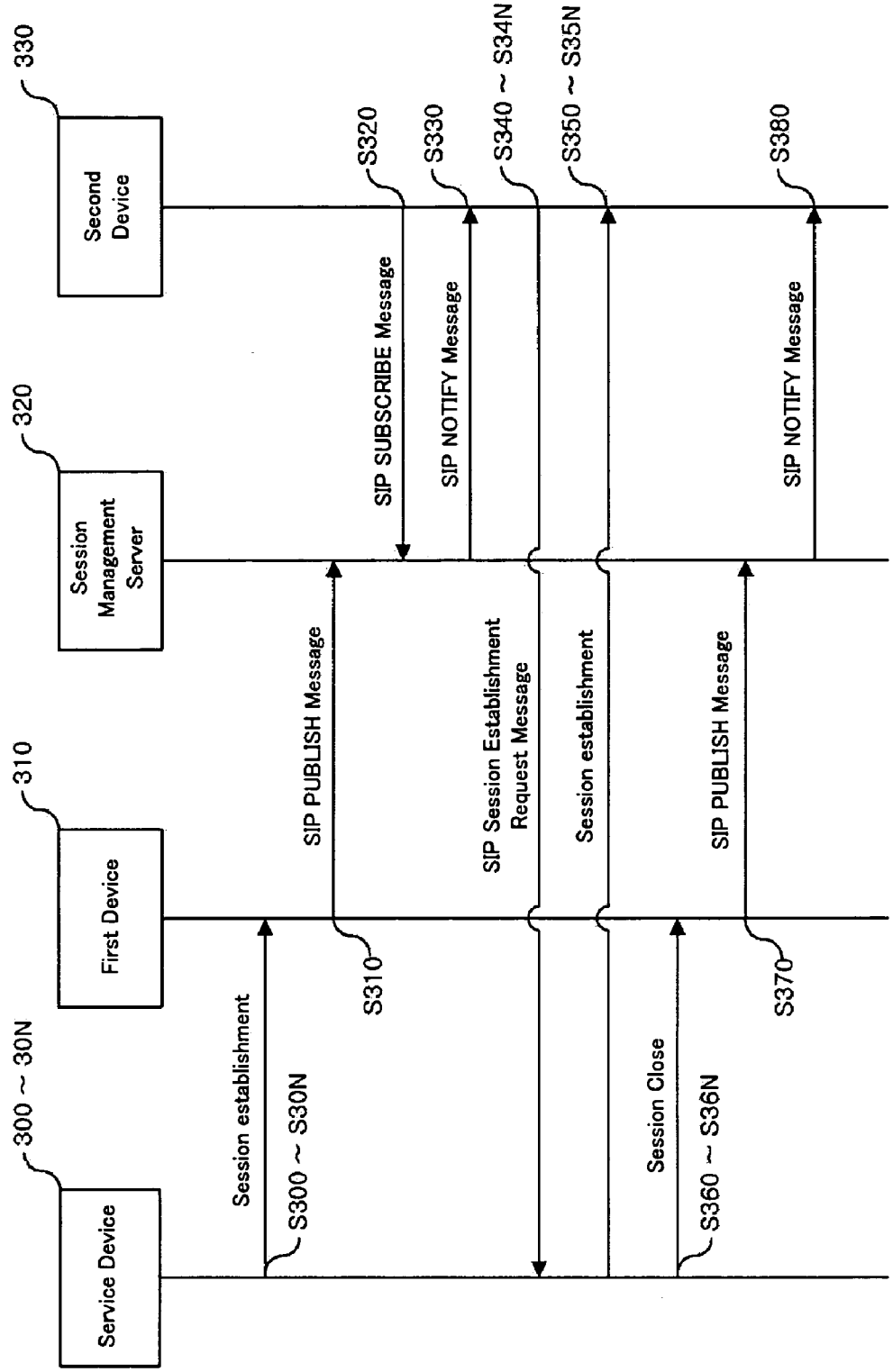
[FIG. 5]

METHOD FOR SUPPORTING SESSION MOBILITY

CROSS-REFERENCE TO RELATED APPLICATION

This application claims priority to and the benefit of Korean Patent Application 10-2004-0105570 filed in the Korean Intellectual Property Office on Dec. 14, 2004, the entire content of which is incorporated herein by reference.

BACKGROUND OF THE INVENTION (a) Field of the Invention

The present invention relates a method for supporting session mobility. More particularly, the present invention relates to a method for supporting session mobility that is capable of moving various sessions using session initiation protocol (SIP).

(b) Description of the Related Art

Recently, the Internet network has been used for various services such as a communication service, a streaming service, as well as an information exchange service.

For those services, at least one session is created between a service provider (hereinafter called a server) and a service receiver (hereinafter called a client). The session generally includes a session ID and session information, that is, data corresponding to the session ID. The session ID is stored at the client and the session information is stored at the server. When the client is disconnected from the server, it is impossible to re-connect to the server without the session information.

For example, when a client establishes a session with a server using a mobile terminal, if he changes to use a fixed terminal in order to save a high cost, then the session is not well preserved using the fixed terminal. So the client manually establish a new session with the server to use the service continuously.

Recently various methods for supporting session mobility have been proposed.

FIG. 1 is a flowchart for supporting session mobility using SIP REFER method.

A first terminal unit 10 sends a SIP INVITE message to a second terminal unit 11 to request SIP session establishment (S10), the second terminal unit 11 sends a 200 OK message to respond to the session establishment request (S11), and the first terminal unit 10 sends a SIP ACK message acknowledging to the 200 OK message to establish a SIP session (S12).

Then, the second terminal unit 11 moves the SIP session with the first terminal unit 10 to a third terminal 12 as follows. The second terminal unit 11 sends a SIP REFER message to the third terminal unit 12 which cause the third terminal unit 12 to request SIP session establishment with the first terminal unit 10 using the session information from the SIP REFER message (S13).

The third terminal unit 12 sends a SIP NOTIFY message to the second terminal unit 11 to notify of accepting the session transfer request (S14).

The third terminal unit 12 sends a SIP INVITE message to the first terminal unit 10 to request session establishment. The SIP INVITE message includes information for requesting the first terminal unit 10 to close the session with the second terminal unit 11 (S15).

The first terminal unit 10 sends a 200 OK message to respond the session establishment request (S16), and the third terminal unit 12 sends the SIP ACK message acknowledging to the 200 OK messages to establish a SIP session (S17).

The first terminal unit 10 terminates the session established between the first terminal unit 10 and the second terminal unit 11 according to an information in the SIP INVITE message received from the third terminal unit 12.

A method for supporting session mobility disclosed in US Patent Application Publication U.S. 2003/0195963 A1 is described with reference to FIG. 2.

When a user accesses a web server 22 using a web browser at the first terminal unit 20, a session is established between the user and the web server (S20). Then, the user generates a snapshot of the session and transfers the snapshot to a browser session preservation and movement (BSPM) proxy server 21 (S21). When the user accesses the BSPM proxy server using a web browser at a second terminal unit 23, the user receives the snapshot of the session generated before (S22). Next, the second terminal unit 23 accesses the web server 22, and establishes and preserves the session using session information in the snapshot (S23).

However, the SIP REFER method for supporting session mobility according to a previous work shown in FIG. 1 includes only information of the other party of the session. So the characteristic of the session cannot be preserved. Also, the SIP REFER method only supports mobility of SIP INVITE-initiated session. The BSPM proxy approach for supporting session mobility according to the previous work shown in FIG. 2 only supports mobility of the web session.

Moreover above-mentioned approaches for supporting session mobility can be applied to support mobility of one session. So, when many sessions are need to be moved from one terminal to another terminal, there is a problem in that those sessions should be moved one by one.

The above information disclosed in this Background section is only for enhancement of understanding of the background of the invention and therefore it may contain information that does not form the prior art that is already known in this country to a person or ordinary skill in the art.

SUMMARY OF THE INVENTION

The present invention has been made in an effort to provide a method for supporting session mobility having advantages of simultaneously moving various sessions by utilizing SIP.

An exemplary method for supporting session mobility from a first device having several sessions to a second device according to an embodiment of the present invention includes a) determining whether an address of a second device is defined clearly by a first device when sessions needs to be moved from the first device; and b) at a), transferring session information including data for supporting session mobility from the first device to the second device when the address of the second device is defined clearly by the first device, and transferring the session information data from the first device to the session management server when the address of the second device is not defined clearly.

An exemplary recording medium for supporting session mobility from a first device having several sessions to a second device according to an embodiment of the present invention includes a) determining whether an address of a second device is defined clearly by a first device when sessions needs to be moved from the first device; and b) at a), transferring session information including data for supporting session mobility from the first device to the second device when the address of the second device is defined clearly by the first device, and transferring the session information data from the first device to the session management server when the address of the second device is not defined clearly.

BRIEF DESCRIPTION OF THE DRAWINGS

FIG. 1 is a flowchart of one method for supporting session mobility according to the prior art.

FIG. 2 is a flowchart of another method for supporting session mobility according to the prior art.

FIG. 3 is a schematic diagram of a session mobility system according to an embodiment of the present invention.

FIG. 4 is a flowchart of a method for supporting session mobility according to the first exemplary embodiment of the present invention.

FIG. 5 is a flowchart of a method for supporting session mobility according to the second exemplary embodiment of the present invention.

DETAILED DESCRIPTION OF THE EMBODIMENTS

Hereinafter, an embodiment of the present invention will be described in detail with references to accompanying drawings.

In the following detailed description, only certain exemplary embodiments of the present invention have been shown and described, simply by way of illustration, in order to people without skill in this art would realize. But, the described embodiments may be modified in various different ways and the present invention is not limited to the described embodiments.

FIG. 3 is a schematic diagram of a session mobility system according to an embodiment of the present invention.

The session mobility system can be applied to any service using a session. Such a service may include a web service, a streaming service, a VoIP service, a video telephony service, and so on.

Referring to FIG. 3, the session mobility system includes a first module 110 for initiating a session mobility service, a second module 120 for receiving the session mobility service, and a session management server 130 for mediating the session mobility.

The first module 110 includes a user interface 111 of a session transferring side, a session data generation module 112, a session event information publishing module 113, and a SIP message transferring module 114.

The user interface 111 selects a service program which needs to be notified of the session mobility, specifies a device to which a session is moved (referred to as a target device hereinafter), and provides an interface so as to execute a session mobility. The user interface 111 can select one or more service programs which need to be notified of the session mobility.

The session data generation module 112 generates data (hereinafter called session data) for sessions that are currently used by the service program in cooperation with the service program. In detail, when a service program is selected by the user interface 111 and executes the session mobility, the session data generation module 112 generates session data that are currently used by the service program. The session data generation module 112 generates one session data set per session. The session data set may include addresses of two peers of the session, a session ID of the session, a cookie, and other session specific information.

The session event information publishing module 113 generates a SIP PUBLISH message which includes session data generated as above. And if the address of the target device is specified by the user interface 111, the destination of the SIP PUBLISH message is decided as that address. Or, if the address of the target device is not specified, the destination of the SIP PUBLISH message is decided as the address of the session management server.

The SIP message transferring module 114 transfers the SIP PUBLISH message generated from the session event information publishing module 113 to the destination address included in the SIP PUBLISH message through the network.

The second module 120 includes a SIP message reception processing module 121, a user interface 122 for receiving a session, a session establishing module 123, a SIP message transferring module 124, and a session event subscribing module 125.

The SIP message reception processing module 121 receives the SIP PUBLISH message including the session data or the SIP NOTIFY message, and extracts the session data from the SIP PUBLISH message or the SIP NOTIFY message.

The user interface 122 notifies a service program that needs to be notified of the session mobility event and provides an interface capable of executing the session re-establishment to the user. Alternatively, the user interface 122 provides an interface capable of being connected with the session management server 130 to the user.

When the user interface 122 is executing the session re-establishment, the session establishment module 123 generates a session establishment request message based on the session information included in the SIP PUBLISH message or SIP NOTIFY message which is received by the SIP message reception processing module 121. The session establishment request message includes information for requesting the session peer to close the previously connected session. In this case, the session establishment module 123 generates a session establishment request message per session data set. The destination address of the session establishment request message is defined as the peer of the corresponding session.

The SIP message transferring module 124 transfers the session establishment request message generated from the session establishment module 123 to an address of the destination included in the corresponding session establishment request message.

When the user interface 122 requests that the session event subscribing module 125 connect the session management server 130, the session event subscribing module 125 generates a SIP SUBSCRIBE message and transfers the SIP SUBSCRIBE message including the user identification to the session management server 130.

Generally, the first module 10 and the second module 120 are installed in one device. The device including the first module 110 and the second module 120 can execute and receive the session mobility.

The session management server 130 includes a SIP message reception processing module 131, a session event subscribing processing module 132, a session mobility controlling module 133, a session event information management module 134, and a SIP message transferring module 135.

The SIP message reception processing module 131 receives the SIP message through the network. It classifies the SIP PUBLISH message or SIP SUBSCRIBE message received according to the user identification included in the corresponding SIP message. Then, the SIP PUBLISH message is dispatched to the session mobility controlling module and the SIP SUBSCRIBE message is dispatched to the session event subscribing processing module.

The session event subscribing processing module 132 processes the SIP SUBSCRIBE message received by the SIP message reception processing module 131 in collaboration with the session event information management module 134.

The session mobility controlling module 133 processes the SIP PUBLISH message received by the SIP message reception processing module 131. It extracts the session data and user identification from the SIP PUBLISH message and dispatches the session data to the session event information management module.

The session event information management module 134 stores and manages the session data and the user identification extracted from the session mobility controlling module 133. Also, when the session event subscribing processing module 132 receives the SIP SUBSCRIBE message, the session event information management module 134 searches a session data having the same user identification as the user identification included in the SIP SUBSCRIBE among stored session data. When the session event information management module 134 has found a session data having the same user identification as the user identification included in the SIP SUBSCRIBE among stored session data, the session event information management module 134 generates a SIP NOTIFY message and incorporates the session data having the same user identification into the SIP NOTIFY message.

The SIP message transferring module 135 transfers the SIP NOTIFY message generated from the session event information management module 134 to the sender of the SIP SUBSCRIBE message through a network.

FIG. 4 is a flowchart of a method for supporting session mobility according to the first exemplary embodiment of the present invention.

A first device 210 and a second device 220 respectively include the first module, the second module, and various programs for supporting session mobility shown in FIG. 3, and respective service devices 200 to 20N provide services to a first device and a second device connecting sessions with those devices.

The first device 210 is in services with respective sessions connected with respective service devices 201 to 20N. The sessions include various sessions, for example, a SIP session, an RTSP session, an HTTP session, or the like (S200 to S20N). Here, a procedure for moving the respective sessions connected with the respective service devices 200 to 20N from the first device 210 to the second device 220 is as follows.

When the user initiates to move sessions from the first device 210, the first device 210 generates a session data set for each session. The session data set may include addresses of two peers of the session, a session ID of the session, a cookie, and other session specific information.

Also, the first device 210 makes a SIP PUBLISH message and incorporates the generated session data set and user identification into the SIP PUBLISH message. In this case, when the address of the target device (for example, the second device) is defined by the first device 210, the first device 210 includes the destination address as the second device 220 in the SIP PUBLISH message and sends the SIP PUBLISH message to the second device 220 (S210).

After the second device 220 receives the SIP PUBLISH message, the second device 220 makes the session establishment request message based on the received the SIP PUBLISH message and transfers the session establishment request message to the respective service devices 200 to 20N. The session establishment request message also includes information to request for the respective service devices to terminate the previously established sessions between the first device 210 and the service devices 200 to 20N (S220 to S22N).

The respective service devices 200 to 20N establish new sessions S230 to S23N between the respective service devices 201 to 20N and the second device 220 after receiving of the session establishment request message.

The respective service device 200 to 20N terminate the previously established sessions between the respective service devices 201 to 20N and the first device 210 by information of the session establishment request message (S240-S24N).

The first device 210 then sends the SIP PUBLISH message to inform of the result of session movement to the second device 220 (S250).

Next, a method for supporting session mobility according to the second exemplary embodiment of the present invention is described with reference to FIG. 5.

The first device 310 and the second device 330 respectively include the first module, the second module, and various programs for supporting session mobility shown in FIG. 3, and a session management server 320 operates as shown in FIG. 3. The respective service devices 300 to 30N provide services to a first device and second device connecting sessions with those devices.

The first device 310, the second device 330, the session management server 320, and the respective service devices 300 to 30N are connected to each other through the network.

The first device 310 is in services with respective sessions connected with respective service devices 301 to 30N. The sessions include various sessions, for example, a SIP session, an RTSP session, an HTTP session, or the like (S300 to S30N). Here, a procedure for moving the respective sessions connected with the respective service devices 300 to 30N from the first device 310 to the second device 330 through the session management server 320 as follows.

When the user initiates to move sessions from the first device 310, the first device 310 generates a session data set for each session. The session data set may include addresses of two peers of the session, a session ID of the session, a cookie, and other session specific information.

Also, the first device 310 makes a SIP PUBLISH message and incorporates the generated session data set and user identification tokens into the SIP PUBLISH message. In this case, when the address of the target device (for example, the second device) is not defined by the first device 310, the first device 310 includes the destination address as the session management server 320 in the SIP PUBLISH message and sends the SIP PUBLISH message to the session management server 320. The session management server 320 receives the SIP PUBLISH message, extracts the session data set and user identification from the SIP PUBLISH message and stores the session data (S310).

The second device 330 transfers the SIP SUBSCRIBE message to the session management server 320. The SIP SUBSCRIBE message includes the user identification (S320).

After receiving the SIP SUBSCRIBE message, the session management server 320 searches for a session data set having the same user identification as the user identification included in the SIP SUBSCRIBE among stored session data. When the session management server 320 has found a session data set having the same user identification, the session management server 320 generates a SIP NOTIFY message and incorporates the session data having the same user identification into the SIP NOTIFY message and transfers the message to the sender of the SIP SUBSCRIBE message, the second device 330 (S330).

The second device 330 receives the SIP NOTIFY message and makes the session establishment request message based on the received the SIP NOTIFY message and transfers the session establishment request message to the respective service devices 300 to 30N. The session establishment request message includes information to request for the respective service devices to terminate the previously established sessions between the first device 310 and service devices 300 to 30N (S340 to S34N).

The respective service devices 300 to 30N establish new sessions between the respective service devices 300 to 30N and the second device 330 after receiving the session establishment request message (S350-S35N).

The respective service devices 300 to 30N terminate the previously established sessions between the respective service devices 300 to 30N and the first device 310 by information of the session establishment request message (S360 to S36N).

The first device 310 sends the SIP PUBLISH message to inform of the result of session movement to the session management server 320 (S370).

The session management server 320 transfers the SIP NOTIFY message for notifying a result of the session movement to the second device 330 (S380).

According to the first and second exemplary embodiments of the present invention, the method for supporting session mobility can simultaneously move various sessions without specifying a target device. Accordingly, the user can utilize various services as they are regardless of changing a service receiving device while the user utilizes various services.

The method for supporting session mobility according to the first exemplary embodiment of the present invention and the second exemplary embodiment can be performed by software. The software may be stored in such a recording medium as a magnetic disk (including a flexible disk), optical disk (CD-ROM), DVD, magneto optical disk (MD), and memory.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

As above noted, according to the embodiment of the present invention, various sessions can be simultaneously moved by utilizing a SIP PUBLISH message.

Accordingly, the user can utilize various services as they are regardless of changing a service receiving device while the user utilizes various services.

Also, sessions can be effectively moved regardless of knowing a target device to which sessions is moved.

What is claimed is:

1. A method for supporting session mobility from a first device having respective sessions connected with at least one service device to a second device, comprising:
   a) determining whether an address of the second device is defined by the first device when the session movement begins from the first device;
   b) at a), transferring session information including data for supporting session mobility from the first device to the second device when the address of the second device is defined clearly by the first device, and transferring the session information data from the first device to the session management server when the address of the second device is not defined clearly;
   at b), when the session data is transferred to the session management server, c) storing the session data and the user identification of the received SIP PUBLISH message at the session management server;
   d) transferring a SIP SUBSCRIBE message including the user identification from the second device to the session management server;
   e) transferring the session data having the same user identification as the user identification included in the SIP SUBSCRIBE message from the session management server to the second device through a SIP NOTIFY message;
   f) generating a SIP session establishment message from the second device and transferring the SIP session establishment message to the predetermined service device by utilizing the received SIP NOTIFY message; and
   g) establishing new sessions between the service device and the second device by utilizing the received SIP session establishment message.

2. The method for supporting session mobility of claim 1, wherein the session data is transferred by utilizing a SIP PUBLISH message.

3. The method for supporting session mobility of claim 1, further comprising:
   at b), when the session data is transferred to the second device, c) generating an SIP session establishment message from the second device by using the received session data, and transferring the SIP session establishment message from the second device to a predetermined service device; and
   d) establishing new sessions between the service device and the second device by utilizing the received SIP session establishment message.

4. The method for supporting session mobility of claim 3, further comprising:
   after d), e) terminating the previously established sessions between the service device and the first device by utilizing the received SIP session establishment message.

5. The method for supporting session mobility of claim 4, further comprising:
   after e), f) publishing a result of a session movement from the first device to the second device through a SIP PUBLISH message.

6. The method for supporting session mobility of claim 1, further comprising: after g), h) terminating the previously established sessions between the service device and the first device by utilizing the received SIP session establishment message.

7. The method for supporting session mobility of claim 6, further comprising:
   after h), i) publishing a result of the session movement from the first device to the session management server through a SIP PUBLISH message.

8. The method for supporting session mobility of claim 7, further comprising:
   after i), j) notifying a result of the session movement from the session management server to the second device through the SIP NOTIFY message.

9. The method for supporting session mobility of claim 1, wherein the session data includes data needed to establish new session, including at least one of addresses of two peers of the session, a session ID of the session, a cookie, and other session specific information.

10. The method for supporting session mobility of claim 2, wherein the session data is generated for each session, and the SIP PUBLISH message includes at least one session data.

* * * * *